US008591236B2

(12) United States Patent
Vecerina et al.

(10) Patent No.: US 8,591,236 B2
(45) Date of Patent: Nov. 26, 2013

(54) INTERACTIVE MEDICAL TRAINING SYSTEM AND METHOD

(75) Inventors: Ivan Vecerina, Lausanne (CH); Jurjen Zoethout, Payerne (CH); Murielle Launay, Geneva (CH)

(73) Assignee: Xitact S.A., Morges (CH)

( * ) Notice: Subject to any disclaimer, the term of this patent is extended or adjusted under 35 U.S.C. 154(b) by 2115 days.

(21) Appl. No.: 11/101,154

(22) Filed: Apr. 7, 2005

(65) Prior Publication Data

US 2005/0221263 A1 Oct. 6, 2005

Related U.S. Application Data

(63) Continuation-in-part of application No. PCT/CH02/00556, filed on Oct. 7, 2002.

(51) Int. Cl.
*G09B 23/28* (2006.01)
(52) U.S. Cl.
USPC ............................ 434/262; 434/322; 434/323
(58) Field of Classification Search
USPC ................................... 434/262, 267; 382/128
See application file for complete search history.

(56) References Cited

U.S. PATENT DOCUMENTS

| | | | | |
|---|---|---|---|---|
| 4,839,822 A * | 6/1989 | Dormond et al. | ............... | 706/45 |
| 5,546,943 A * | 8/1996 | Gould | ........................... | 600/425 |
| 5,740,802 A * | 4/1998 | Nafis et al. | .................... | 600/407 |
| 5,766,016 A * | 6/1998 | Sinclair et al. | ................ | 434/262 |
| 6,132,218 A * | 10/2000 | Benja-Athon | ................ | 434/267 |
| 6,421,560 B1 * | 7/2002 | Yoo | ................ | 600/548 |
| 6,690,397 B1 * | 2/2004 | Daignault, Jr. | ................ | 715/764 |
| 6,747,672 B1 * | 6/2004 | Haakonsen et al. | .......... | 715/700 |
| 7,202,851 B2 * | 4/2007 | Cunningham et al. | ........ | 345/156 |
| 2004/0136578 A1 * | 7/2004 | Sieracki et al. | ............... | 382/128 |

* cited by examiner

*Primary Examiner* — Nikolai A Gishnock
(74) *Attorney, Agent, or Firm* — The Webb Law Firm

(57) ABSTRACT

A method for training a user in a medical procedure utilizes an interactive computer system with a virtual representation of at least one organ and at least one instrument. The representation of surface area parts of the virtual organ to be treated are covered with a graphical identification marker. The computer system includes a table stored in memory comprising situations arising within the medical procedure predefined through positions of the instrument(s), positions of the organ(s), the logical sequence of steps to be executed within the medical procedure, different aspect values for the graphical identification markers and assessment values for the situation. Upon interaction of the user with the organ and the instrument, graphical identification markers change their aspect according to the stored value in the table for the predefined situation and the corresponding assessment value is stored in a history log table within the computer system.

11 Claims, 2 Drawing Sheets

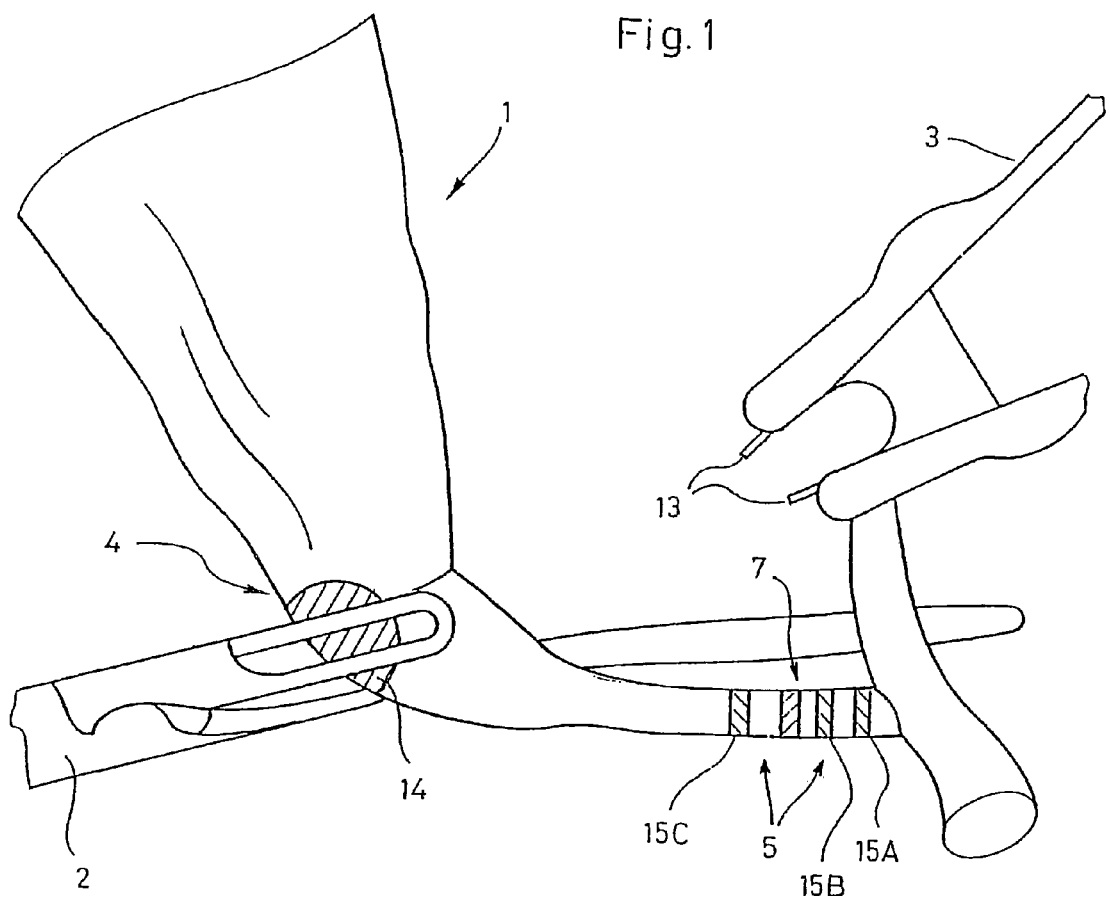
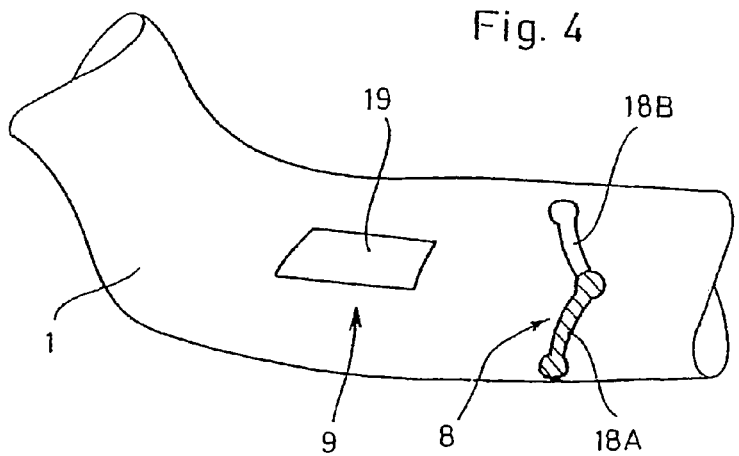

| 50 | Virtual Patient |
|---|---|
| 51 | Gripping |
| 52 | Clipping |
| 53 | Cutting |
| 55 | Tutored Intervention |
| 56 | Free Intervention |
| 57 | Assessment |
| 58 | Administration |

Fig. 2

| CLIPPING | |
|---|---|
| 61 | Prerecorded Video |
| 62 | Prerecorded Virtual Reality |
| 63 | Instructions |
| 64 | Common Errors |
| 65 | Tutored Intervention Step |
| 66 | Free Intervention Step |

Fig. 3

INTERACTIVE MEDICAL TRAINING SYSTEM AND METHOD

CROSS REFERENCE TO RELATED APPLICATION

This application is a Continuation-in-Part of International Patent Application No. PCT/CH2002/000556, filed Oct. 7, 2002, designating inter alia, the United States, which international application is herein incorporated by reference.

FIELD OF THE INVENTION

The invention relates generally to an interactive medical training system.

BACKGROUND OF THE INVENTION

Specialized force-feedback devices are more and more proposed for medical training of surgeons, especially in view of endoscopic interventions or under X-ray visualization. Haptic interfaces accommodate the different controllers and environments.

U.S. Pat. No. 6,131,097 shows a haptic/visual authoring tool comprising a disclosure of controlling an avatar interacting with a virtual object, generating responsive forces.

It is known from prior art that the user in training manipulates handles of actual endoscopic instruments in front of a box being the simulation of a torso of a patient. The images of the users actions with said instruments are shown on a video display. Said video display shows computer generated images of the instruments used and the environment (i.e. organs etc.).

U.S. Pat. No. 5,791,907 discloses a method for training a user in a medical procedure utilizing an interactive computer system, said medical procedure having a plurality of steps. Following the answers of the user on specific questions of the system, the system provides an ongoing display history in connection with the correct answers and the errors.

The need remains, however, for a method and system to organize the training to guide the user and to provide a measurable result at the end of a training session, usable by the person trained and the training center.

SUMMARY OF THE INVENTION

The present invention relates on the insight that a method for training a user in a medical procedure has to divide the training session into smaller parts, that the user should be able to start every of these parts repeatedly in an environment of a perfectly completed former part, that the method has to guide the user within the different steps, and that the method has to provide an assessment at the end of a completed training session clearly showing the results and especially possible weaknesses of the user in view of further training sessions.

Preferably the result (i.e. the assessment) of a training session is available for a supervisor of the training session in connection with a stored session history to be able to evaluate the errors together with the user at any later moment.

Such training sessions can be conducted as endoscopic interventions and/or interventions using X-ray visualization.

BRIEF DESCRIPTION OF THE DRAWINGS

FIG. 1 shows a schematic view of a virtual organ, two instruments and several graphical identification markers, FIG. 2 shows a screen display showing different steps of the training session available in connection with the simulated treatment of the organ according to FIG. 1, FIG. 3 shows a screen display showing different sub-steps of a step according to FIG. 2, and FIG. 4 shows a schematic view of another virtual organ with further graphical identification markers.

DETAILED DESCRIPTION OF THE INVENTION

FIG. 1 shows a schematic view of an organ 1 together with two instruments 2 and 3 as it is generated on a screen visible to the user in the training session. Said representations of organ 1 and instruments 2 and 3 are virtual geometrical elements within a computer controlled virtual environment. The instruments 2 and 3 are connected through a control arrangement to physical devices, namely handles of (fake) surgical instruments, which are manipulated by the user in said training session. The background of the image according to FIG. 1 shows a virtual representation of the abdominal cavity (not shown).

The user has to perform a surgical interaction, i.e. a simulated treatment of said organ 1. FIG. 2 shows a screen display of different steps of the training session available in connection with the simulated treatment of the organ 1 according to FIG. 1. Within the embodiment shown, and as an example, this surgical interaction may comprise:

step 51: gripping of the organ in the area 4 with instrument 2 and
step 52: setting clips in the area 5 with help of the instrument 3, and.
step 53: cutting a vessel in an area 7.

In reality this surgical operation has to be performed in a row within a preferred time limit. In the simulated environment the training is separated into different training steps 51 to 53. There are three training steps within this embodiment. The different steps 51 to 53 can be chosen independently from a menu as shown in FIG. 2. Additionally the menu comprises a step 50: information about the virtual patient, step 55: tutored intervention of all steps 51 to 53 within one step, step 56: complete "free" intervention of all steps 51 to 53 within one step, and step 57: assessment of the training session.

Further steps for maintenance of the user information, storing or retrieving parameters for the intervention (e.g. parameters of the virtual patient, surgical problems arising with said patient, etc.) and/or storing or retrieving of different training sessions (e.g. for later assessment) may be included within the menu display and are summarized under reference numeral 58: administration.

Every of the three steps 51 to 53 is organized within sub-steps which have preferably the identical layout within every step 51 to 53 for easy reference. Therefore, choosing one of the steps 51 to 53 on the screen leads to a new menu. In the case depicted in FIG. 3 step 52 "clipping of the organ" is the header of the menu wherein each step comprises preferably the following identical sub-steps, which can be chosen independently from the menu:

sub-step 61: a prerecorded video representation of said step 51 or 52 or 53 within a real intervention,
sub-step 62: a prerecorded virtual reality video representation of the intervention to be performed within said step 51 or 52 or 53 based on the structure of the virtual reality environment,
sub-step 63: instructions for the intervention of said step 51 or 52 or 53, sub-step 64: a prerecorded virtual reality graphical (stills) or video representation of common errors within said step 51 or 52 or 53, which can usually be picked from a further listing submenu, sub-step 65: training session of the step in question with guidance, sub-step 66: training session of the step in question without guidance.

The main advantage of this procedure is based on the insight that the user can be directed within each step and repeat the steps in which he needs the most training. This preparation together with the guidance through the below mentioned graphical codes gives a better training result. Additionally the result of the simulated intervention is stored and the evaluation is possible on parts of the intervention or the whole process.

Within every sub-step 65 the graphical representation comprises a direct correlation with the action of the instrument handled by the user. This can be shown within the embodiment of the intervention as follows.

Within the step 52 "clipping", the user has to move the instrument 2 towards the organ 1 and grip it in an area 4 (same procedure as in the step 51 "gripping"). Then he has to hold the organ 1 in a certain position and to apply three clips in the two areas 5 (in order to enable the cutting of the vessel in step 53 "cutting" between the clips in area 7).

Before the user has gripped the organ 1, the area within which the instrument 2 has to be applied is marked through a blue dot 14 (the area shaded in the drawing). When the area 4 is gripped, the dot changes its color, e.g. into yellow until the user has pulled the organ 1 into the corrected position, upon which occasion the dot changes its color a further time, e.g. into green. Since the user has to hold instrument 2 throughout the step in an extended period of time, he may deviate from the correct position, and the controller changes the color from green to red, when the position is not correct anymore. A less correct position may be marked yellow. Such graphical feedback enables the user to find the correct position and the dot 14 becomes green again.

The step 52 "clipping" asks the user to put three clips into predefined positions, which are marked 15A, 15B and 15C. The necessity to apply the same number of clips to the second vessel in the background is not treated within this simplified approach of the description. At the beginning only one part of area 5, i.e. the ring 15A is blue. The user virtually loads a clip 13 into instrument 3 and approaches the blue ring 15A. Upon application of the clip 13 the blue ring 15A becomes green. If the clip is misplaced, the ring may become yellow or red. Preferably the color red is associated with a hazardous situation and yellow a situation which is not correct according to the teached procedure but not "dangerous" for the virtual patient. Upon fulfillment of the first clipping action the next ring, here 15B or 15C becomes blue and the process is repeated until all clips are set. Then all areas 14, 15A to 15C which are shaded in the drawings and which should be green vanish as indication that the step is completed.

It is then subject of step 53 "cutting" to exchange instrument 3 towards scissors and to cut the vessel in area 7, which is afterwards indicated through a (separated) green ring 7.

Although the intervention of opening surface tissues in an area is not part of the menus according to FIG. 2 or FIG. 3, these further graphical indications are shown in connection with a further schematic drawing, FIG. 4.

FIG. 4 shows a schematic view of another virtual organ 1 with further graphical identification markers 18A, 18B and 19. Organ 1 has a cylindrical form. In case that the user has to mark a path on the organ 1 in the area 8 through treating the surface of the organ with current, a blue line 18A is appearing on the organ. This line 18A has preferably a starting point and an end point which can be seen through enlarged dots. In case that the user marks correctly, the relevant part of the line 18A turns green. If the user burns the area or enters the instrument too deep into the organ, then beside the effect of the virtual representation showing the results of this treatment (smoke, burned points, bleeding) this part of the line turns red. When all blue parts of the line 18A had been treated, the line and the dots turns into green and the next segment 18B is lit up in blue colour. This advises the user where to continue his task until the related step is completed.

Area 19 shows a region in which the user has to open the surface within a larger area. Here the area to be opened is blue and all cut off pieces will loose there blue color and turn green. Upon completion of the task the whole area will have green borders and then the marker areas will vanish.

The concept of guidance is to project a (two-dimensional) surface area information in the area which has to be treated through the user in training. This may be a larger spot, as spot 14 for a gripping action. This may be a ring, as ring 18A for the clipping action. This may be a line or a segment of a line as lines 18A and 18B for marking or cutting purposes. Finally this can be of any geometrical form as polygon 19 which marks the area which has to be treated. The correlation between the instrument and the graphical representation is immediate and gives a direct visual assessment in the training. In case of the line it had been shown that it is possible to directly show the three states: a.) parts still to be treated are in blue b.) parts which have been correctly treated are in green and c.) parts which has been maltreated are in red (or yellow). Beside the possibility to show the errors in color they can also be explained through text which are correlated to the errors through a suitable table. Such a direct computer calculated assessment gives the user the opportunity to correct and ameliorate his performance in one or more of the steps before trying the final (not guided) stage of the intervention.

The drawings according to FIGS. 1 and 4 can be seen as typical for endoscopic interventions but can also show representations of organs under X-ray visualization. The difference between various simulated images, when said representations are based on either visible light or X-ray light or emission coming from other electro-magnetic light sources, lies in the fact that e.g. for X-ray visualization the user sees the 2D-representation of a complete organ or of a part of an organ with different shades or contrast depending on the absorption of the illuminating light used within the tissues. The simulation can further demonstrate the use of contrast generating liquids etc. If a surgeon applies the method and uses equipment (e.g. polarizing glasses) to obtain different (3D) images for his two eyes, than he sees a virtual 3D image of the region under illumination, e.g. a 3D-image of an organ or a part of an organ.

Instead of a differently coloured dot or a differently coloured ring or surface area as mentioned in connection with FIGS. 1 and 4, the method therefore also comprises the generation of a differently coloured volume part, e.g. a organ area part. This enables the surgeon to guide his instrument around or into an organ towards a predetermined organ area part, wherein a different colour as yellow or red appears, if the instrument used grasps or penetrates another region of said organ area part, and wherein said area part becomes e.g. green, if the step is successfully terminated. It is clear that every organ area part, being a three-dimensional body, comprises a surrounding surface, which can receive, during the intervention, the same and/or a different colour than the organ area part concerned. Especially, it is possible to use a surface coloration, wherein one surface lies behind an organ part in question. Said differences in depth can be shown through different colour shades or contrast/luminosity of the parts concerned.

The invention claimed is:

1. A method for training a user in a medical procedure in a simulated surgical interaction in a training session within a simulated environment comprising the steps of:
providing an interactive computer system with a virtual geometrical representation of at least one organ and at least one instrument in the simulated surgical interaction within the simulated environment, wherein the instrument is operated by the user in the training session, wherein the representation of at least one organ part of the virtual organ to be treated is covered with at least one graphical identification marker, wherein the computer system comprises a table stored in memory comprising predefined situations arising within the medical procedure predefined through positions of the at least one instrument, positions of the at least one organ, the logical sequence of steps to be executed within said medical procedure, one or more different aspect values for the one or more graphical identification markers and one or more assessment values for said situation;
changing the aspect of one or more graphical identification markers according to the stored value in said table for the predefined situation upon interaction of the user with the at least one organ and the at least one instrument; and
storing the corresponding assessment value of the training session in a history log table within the computer system.

2. The method according to claim 1, wherein the graphical identification marker is a spot, a ring contour, a line, a polygonal surface or a volume area.

3. The method according to claim 1, wherein the change of aspect of a graphical identification marker is a change of color according to a color table.

4. The method according to claim 1, wherein the assessment value is correlated to a success-and-error-table comprising predefined assessment information.

5. The method according to claim 1, wherein said table of situations comprise one-, two-, or three-dimensional interval values for the position of the organs and instruments.

6. The method according to claim 1, wherein the at least one organ part of the virtual organ is a surface area part or a 3D organ part.

7. The method according to claim 6, wherein a change of aspect of a graphical identification marker for a 3D organ part is different from the change of aspect for a surface area part.

8. The method according to claim 1, wherein the virtual representation is based on a visible light endoscopic representation or an X-ray representation.

9. The method according to claim 1, wherein each of the logical sequence of steps to be executed within said medical procedure is subdivided into identical sub-steps having an identical layout as that of the logical sequence of steps.

10. The method according to claim 9, wherein the sub-steps comprise one or more of the following steps:
a prerecorded video representation of said step within a real intervention,
a prerecorded virtual reality video representation of the intervention to be performed within said step based on the structure of the virtual reality environment,
instructions for the intervention of said step,
a prerecorded virtual reality graphical stills or video representation of common errors within said step,
a training session of said step without guidance.

11. A system for training a user in a medical procedure in a simulated surgical interaction within a simulated environment in a training session comprising an interactive computer system, configured to create a virtual representation of at least one organ and at least one instrument in the simulated surgical interaction within the simulated environment, wherein the instrument is operated by the user in the training session, wherein the representation of organ parts of the virtual organ to be treated are covered with at least one graphical identification marker, wherein the computer system comprises a table stored in a memory of the computer system, wherein the table comprises situations arising within the medical procedure predefined through positions of the at least one instrument, positions of the at least one organ, the logical sequence of steps to be executed within said medical procedure, one or more different aspect values for the one or more graphical identification markers and one or more assessment values for said situation, wherein upon interaction of the user with the at least one organ and the at least one instrument, the one or more graphical identification markers change their aspect according to the stored value in said table for the predefined situation and the corresponding assessment value of the training session is stored in a history log table within the computer system.

* * * * *